(12) United States Patent
Ji

(10) Patent No.: US 7,823,118 B2
(45) Date of Patent: Oct. 26, 2010

(54) COMPUTER READABLE MEDIUM HAVING MULTIPLE INSTRUCTIONS STORED IN A COMPUTER READABLE DEVICE

(75) Inventor: Yan-Liang Ji, Hualien County (TW)

(73) Assignee: United Microelectronics Corp., Hsin-Chu (TW)

( * ) Notice: Subject to any disclaimer, the term of this patent is extended or adjusted under 35 U.S.C. 154(b) by 108 days.

(21) Appl. No.: 11/773,444

(22) Filed: Jul. 5, 2007

(65) Prior Publication Data

US 2009/0013295 A1 Jan. 8, 2009

(51) Int. Cl.
*G06F 17/50* (2006.01)
(52) U.S. Cl. .................. 716/19; 716/1; 716/8; 257/188
(58) Field of Classification Search ........................ 716/1, 716/8, 19; 257/188
See application file for complete search history.

(56) References Cited

U.S. PATENT DOCUMENTS

| 6,261,883 B1* | 7/2001 | Koubuchi et al. ........... 438/197 |
| 6,615,399 B2 | 9/2003 | Yamauchi et al. |
| 6,693,315 B2* | 2/2004 | Kuroda et al. ............... 257/288 |
| 2004/0148584 A1* | 7/2004 | Tokunaga et al. ............. 716/21 |

\* cited by examiner

*Primary Examiner*—Naum B Levin
(74) *Attorney, Agent, or Firm*—Winston Hsu; Scott Margo; Min-Lee Teng

(57) ABSTRACT

A computer readable medium comprising multiple instructions stored in a computer readable device, upon executing these instructions, a computer performing the following steps: providing a semiconductor layout and a circuit pattern; setting a forbidden area of the circuit pattern according to a restriction condition; defining at least a virtual pattern arrangement area on a portion of the semiconductor layout which does not correspond to the forbidden area; and providing a virtual pattern array in the virtual pattern arrangement area.

9 Claims, 18 Drawing Sheets

COMPUTER READABLE MEDIUM HAVING MULTIPLE INSTRUCTIONS STORED IN A COMPUTER READABLE DEVICE

BACKGROUND OF THE INVENTION

1. Field of the Invention

The present invention is related to a computer readable medium comprising multiple instructions stored in a computer readable storage device, and more particularly, to a method for arranging dummy patterns and slot patterns in a semiconductor layout.

2. Description of the Prior Art

In recent years, the designing ruling of semiconductor device has become finer and finer, causing difficulties in controlling width and thickness of a pattern so that it has become harder and harder to overcome the bottleneck accompanied by the development of fabrication technology. When the fabrication technology of integrated circuit is developed to a degree under 130 nanometers, design for reliability/manufacturability (DfR/M) has become an important design factor. Accordingly, an original circuit layout designed by the circuit design engineer cannot be directly formed on a wafer but has to be modified by concerning the difficulties of the fabrication technology for producing a product that satisfies the electrical function of the original circuit design. Commonly, the well-known methods of design for reliability/manufacturability include adding virtual patterns, such as slot patterns or dummy patterns, in an original circuit layout to improve the problems of stress variation, iso-dense loading defect, or process uniformity.

However, the relative positions of the virtual patterns and the original circuit patterns have to be concerned when designing to add virtual patterns in a circuit layout. For example, the distance between one dummy pattern and the wire patterns in an iso region has to be in coordination with the spacing of wire patterns in a dense region for meeting the process uniformity requirement. Furthermore, in a case of adding a slot pattern into a circuit layout, the designer has to make sure that the slot disposed in a metal wide wire should have an enough distance from the contact holes in a lower or upper layer when the circuit layout is fabricated on a semiconductor device, such that the slot would not affect the electrical functions of the semiconductor device. As a result, when adding virtual patterns, whether the slot pattern or the dummy pattern, to an original circuit layout, there should be a minimum interval between the virtual patterns and the circuit patterns of the original circuit layout or some specific circuit patterns of another circuit layout stacked on top or bottom of the original circuit layout so as to avoid the virtual patterns affecting the performance of lithography of the circuit layout or the design of electrical function.

The method of adding dummy patterns according to the prior art is shown in FIG. 1, with the following steps:

Step 10: Provide an original circuit layout with at lest a circuit pattern.

Step 12: Add a dummy pattern group in the original circuit layout.

Step 14: Check and see whether the distance between each dummy pattern of the dummy pattern group and the circuit pattern is smaller than the minimum interval set according to the process conditions, and delete the dummy pattern when the distance is smaller than the minimum interval.

The method of step 12 of adding a dummy pattern group includes arranging pluralities of dummy patterns with a single coordinate system in the original circuit layout. For instance, an array of dummy patterns may be provided by taking the center of the original circuit layout as an origin of the coordinate system of the array. However, since the origin of the dummy pattern group is selected randomly according, it is unable to control the relative position of each dummy pattern and the circuit pattern so that it is likely that the dummy pattern have a distance from the circuit pattern smaller than the minimum interval and has to be deleted. As a result, only a few amounts of dummy patterns can be reserved, and therefore the effect of the dummy patterns disposed between the circuit patterns in the iso region is not obvious and cannot improve the of design for reliability/manufacturability.

Please refer to FIGS. 2-3, which are schematic diagrams of the method for adding dummy patterns in an original circuit layout according to the prior art. As shown in FIG. 2, an original circuit layout 20 is provided, comprising circuit patterns 22, 24 that are wire patterns. Referring to FIG. 3, point A is selected as an origin of a coordinate system of dummy patterns so that a group of dummy patterns 26 are added in the original circuit layout 20, which are arranged as an array. Sequentially, each of the dummy patterns 26 has to be compared with the circuit patterns 22, 24. If the distance between one dummy pattern 26 and the circuit pattern 22 or the circuit pattern 24 is smaller than the minimum interval $D_M$, it has to be deleted. According to the prior art, since the origin point A of the coordinate system of the dummy patterns 26 is positioned at the left and bottom corner of the original circuit layout 20, the three columns of the dummy patterns 26 are leans to the circuit pattern 24 so that the distance between the circuit pattern 22 and the dummy patterns 26 in the second column is larger than the distance between the circuit pattern 24 and the dummy patterns 26 in the second column. As shown in FIG. 3, the distance $D_1$ between the second column of the dummy patterns 26 and the circuit pattern 24 is smaller than the minimum interval $D_M$, but the dummy patterns 26 in the first column or the third column overlap the circuit pattern 22 or the circuit pattern 24. Therefore, each of the dummy patterns 26 in the three columns has a spacing with the circuit pattern 22 or the circuit pattern 24 smaller than the minimum interval $D_M$ and has to be deleted, resulted in that no dummy patterns are remained in the final outputted circuit layout.

On the other hand, if the second column of the dummy patterns 26 is positioned in the middle of the spacing of the circuit pattern 22 and the circuit pattern 24, the distances of the dummy patterns 26 in the second column and the circuit pattern 22 or 24 should be larger than or equal to the minimum interval $D_M$, such that the dumpy patterns 26 in the second column should be remained on the final outputted circuit layout, improving the fabrication performance of the semiconductor device. However, as mentioned above, since the origin point A of the coordinate system of the dummy patterns 26 is selected randomly, it is hard to control the relative positions between each dummy pattern 26 and the circuit patterns 22, 24. As a result, even though there is enough space for arranging the dummy patterns 26 between the circuit patterns 22, 24, all the dummy patterns 26 between the circuit patterns 22, 24 still have to be deleted according to the prior-art method for arranging virtual patterns, and no effective virtual patterns are remained on the circuit layout 20. Therefore, the problem of iso-dense loading defects or the design for reliability/manufacturability cannot be improved.

In order to solve the above-mentioned problem, Yamauchi et al. have proposed an U.S. Pat. No. 6,615,399 to disclose a method for arranging dummy patterns with multiple coordinate systems, whose method process is shown in FIG. 4:

Step 30: Provide an original circuit layout with at least a circuit pattern.

Step 32: Add a first dummy pattern group into the original circuit layout.

Step 34: Check to see whether the distance of each of the first dummy patterns of the first dummy pattern group and the circuit pattern is larger than or equal to the minimum interval? If yes, reserve the first dummy pattern and take it as an effective virtual pattern; otherwise, delete the dummy pattern not satisfying the minimum interval restriction.

Step 36: Add a second dummy pattern group into the original circuit layout.

Step 38: Check to see whether the distance between each of the second dummy patterns of the second dummy pattern group and each of the circuit pattern and the first dummy patterns reserved in step 36 is larger than or equal to the minimum interval? If yes, reserve the second dummy pattern; otherwise, delete the second dummy pattern not satisfying the minimum interval restriction.

Step 40: Add a third dummy pattern group into the original circuit layout.

Step 42: Check to see whether the distance between each of the third dummy patterns of the third dummy pattern group and each of the circuit pattern and the first and second dummy patterns reserved in steps 34, 38 is larger than or equal to the minimum interval? If yes, reserve the third dummy pattern; otherwise, delete the third dummy pattern not satisfying the minimum interval restriction.

Step 44: Combine the circuit pattern and the reserved first, second, and third dummy patterns to output the circuit layout.

Wherein, the step 36 of adding the second dummy pattern group is carried out by defining the second coordinate system as the first coordinate system of the first dummy pattern group shifted by a certain distance, and the step 40 is performed by shifting the coordinate system of the second dummy pattern group by a certain distance along the same direction in step 36 for adding the third dummy pattern group. Therefore, each dummy pattern of the first, second, and third dummy pattern groups are staggered on the circuit layout. To make short of the matter, Yamauchi et al. disclose a method for arranging dummy patterns that includes repeating the conventional method shown in FIG. 1 several times by shifting the coordinate systems of the dummy pattern group. However, according to this method, the total amount of dummy pattern groups and corresponding coordinate systems has to be decided before arranging the dummy patterns, and it still cannot insure that the remained dummy patterns reach the most permutable amount of dummy patterns even though two or more dummy pattern groups are provided. Furthermore, since several dummy patterns in different groups have to be arranged with various coordinate systems, each of which has to be compared with the circuit pattern and previously reserved dummy patterns, it cost much system resource and calculation time according to the method of Yamauchi et al.

As a result, it is still an important issue for the manufacturers to provide a more efficient method for arranging virtual patterns that can effectively control the positions of the virtual patterns so as to obtain the largest amount of the effective virtual patterns reserved in the final circuit layout.

SUMMARY OF THE INVENTION

It is therefore a primary objective of the claimed invention to provide a computer readable medium comprising multiple instructions stored in a computer readable storage device by defining at least a virtual pattern arrangement area for disposing virtual patterns on a semiconductor layout before providing the virtual pattern array in the virtual pattern arrangement area, so that the above-mentioned problem of obtaining quite a few amount of reserved virtual patterns or costing too much system resource for calculating can be solved.

According to the claimed invention, a computer readable medium comprising multiple instructions stored in a computer readable storage device is provided. Upon executing these instructions, a computer performing the following steps: providing a semiconductor layout and at least a circuit pattern; setting a forbidden area of the circuit pattern according to a restriction condition; defining at least a virtual pattern arrangement area on the portion of the semiconductor layout not corresponding to the forbidden area; selecting a positioning point at a boundary of the virtual pattern arrangement area; and providing a virtual pattern array inside the virtual pattern arrangement area according to the positioning point.

According to the present invention, a virtual pattern arrangement area is defined according to a specific restriction condition and the circuit pattern on the semiconductor layout before arranging virtual patterns as an virtual pattern array by taking a positioning point at one boundary of the virtual pattern arrangement area, such that more virtual patterns could be arranged in the virtual pattern arrangement area. As a result, the iso-dense loading defects and design for reliability/manufacturability can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
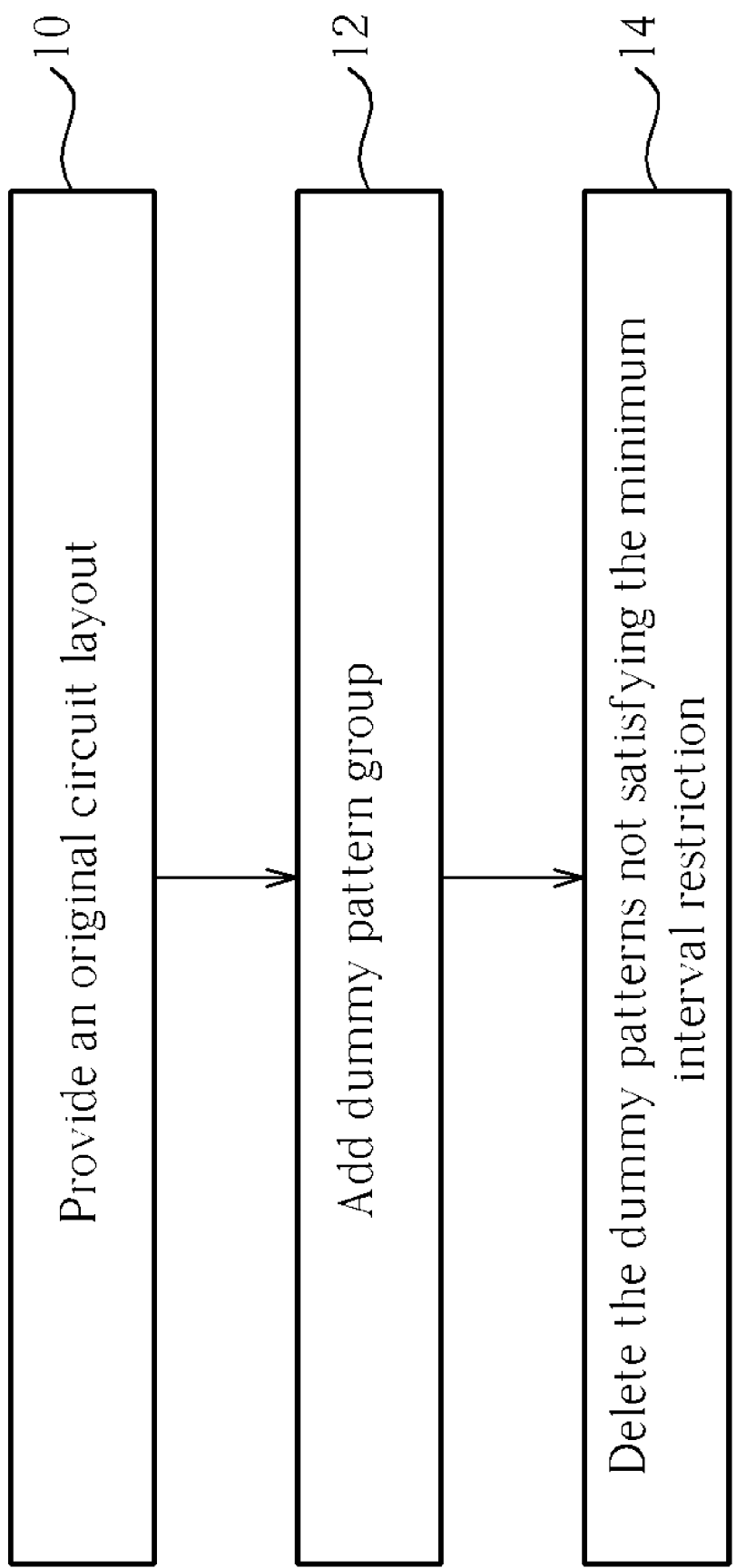
FIG. 1 is a process diagram of the method for adding dummy patterns according to the prior art.
Figure 2:
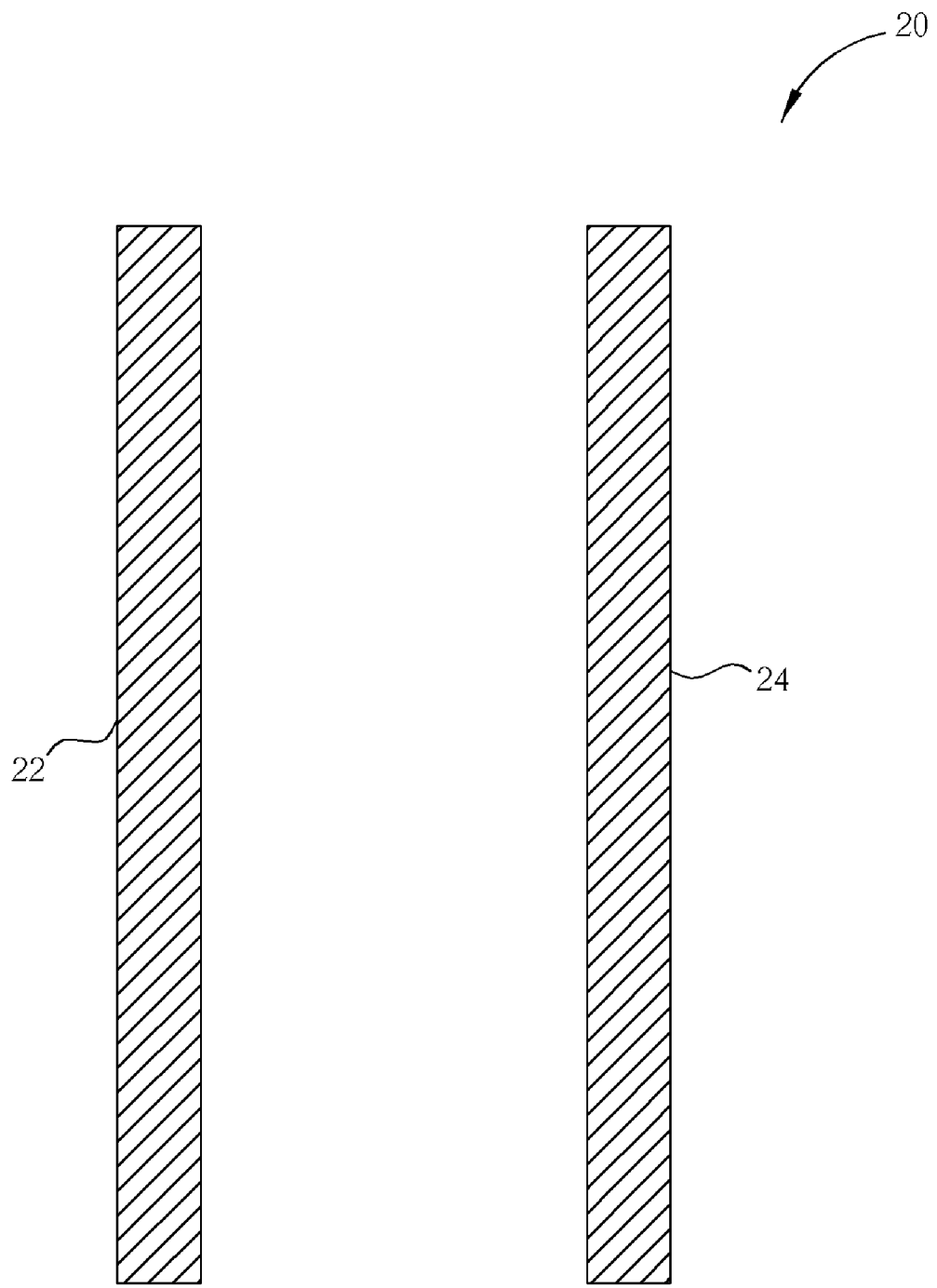
FIGS. 2-3 are schematic diagrams of the method for arranging dummy patterns in a circuit layout according to the prior art.
Figure 3:
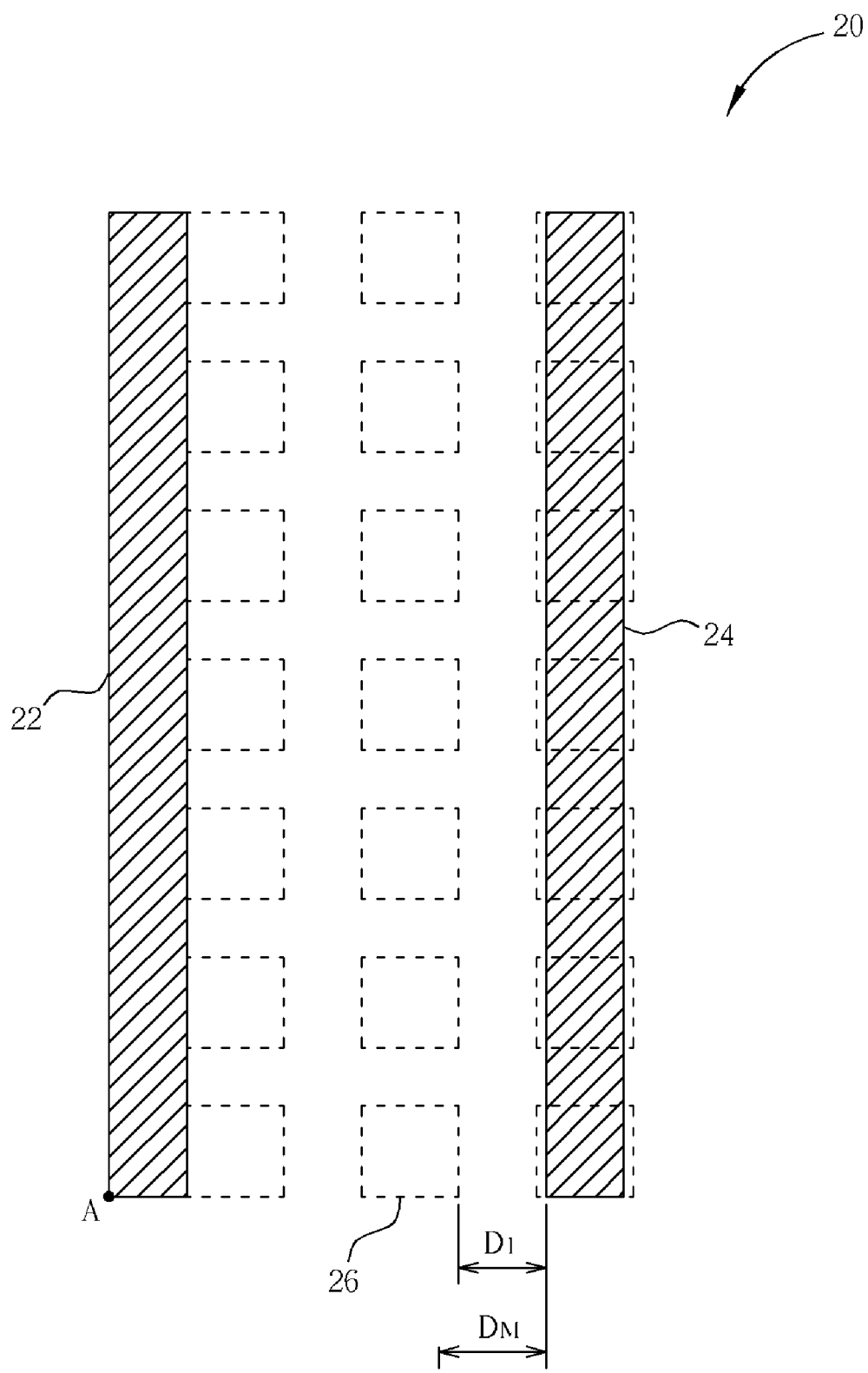
Figure 4:
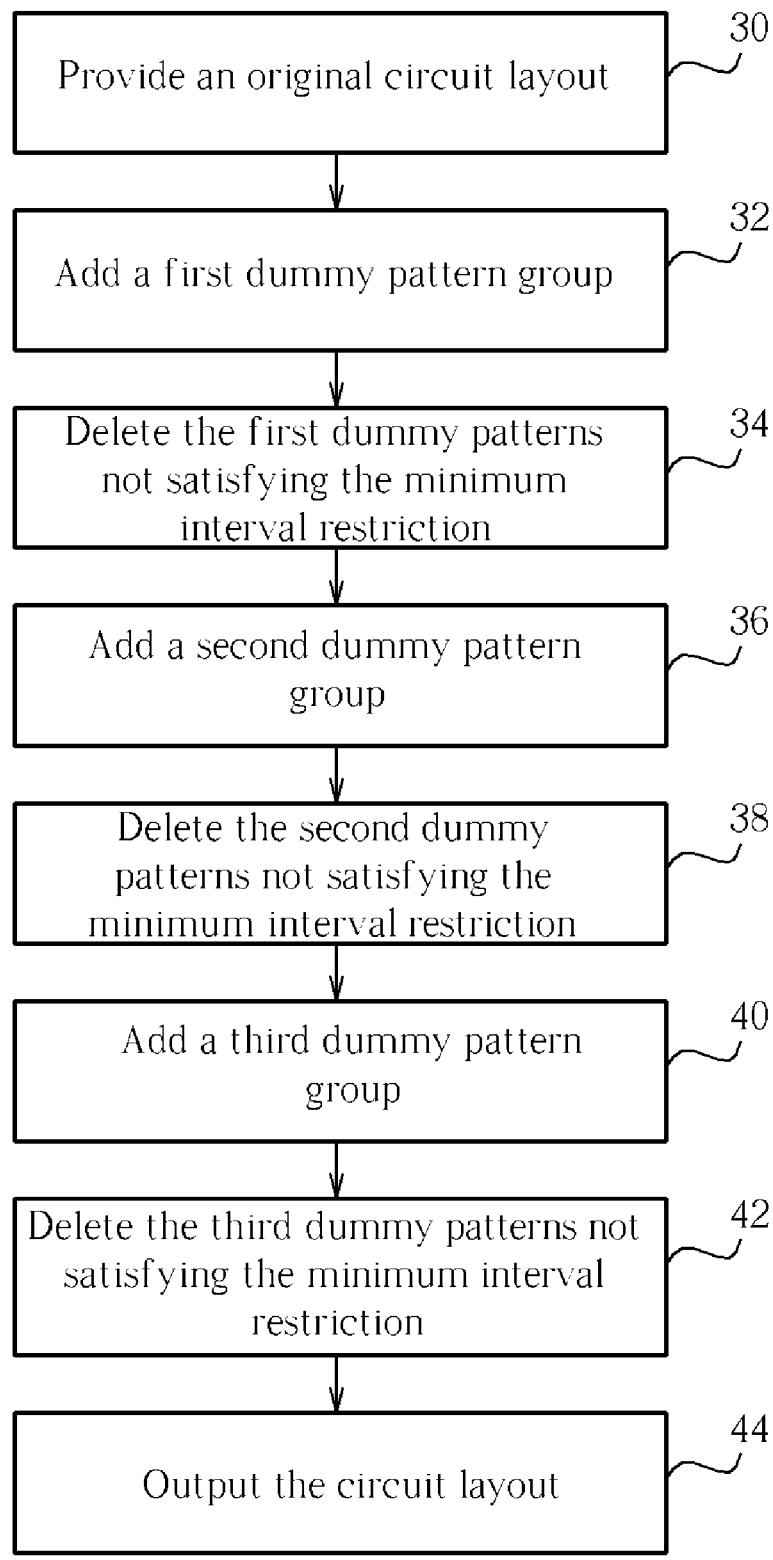
FIG. 4 is a process diagram of a method for arranging dummy patterns disclosed by the U.S. Pat. No. 6,615,399.
Figure 5:
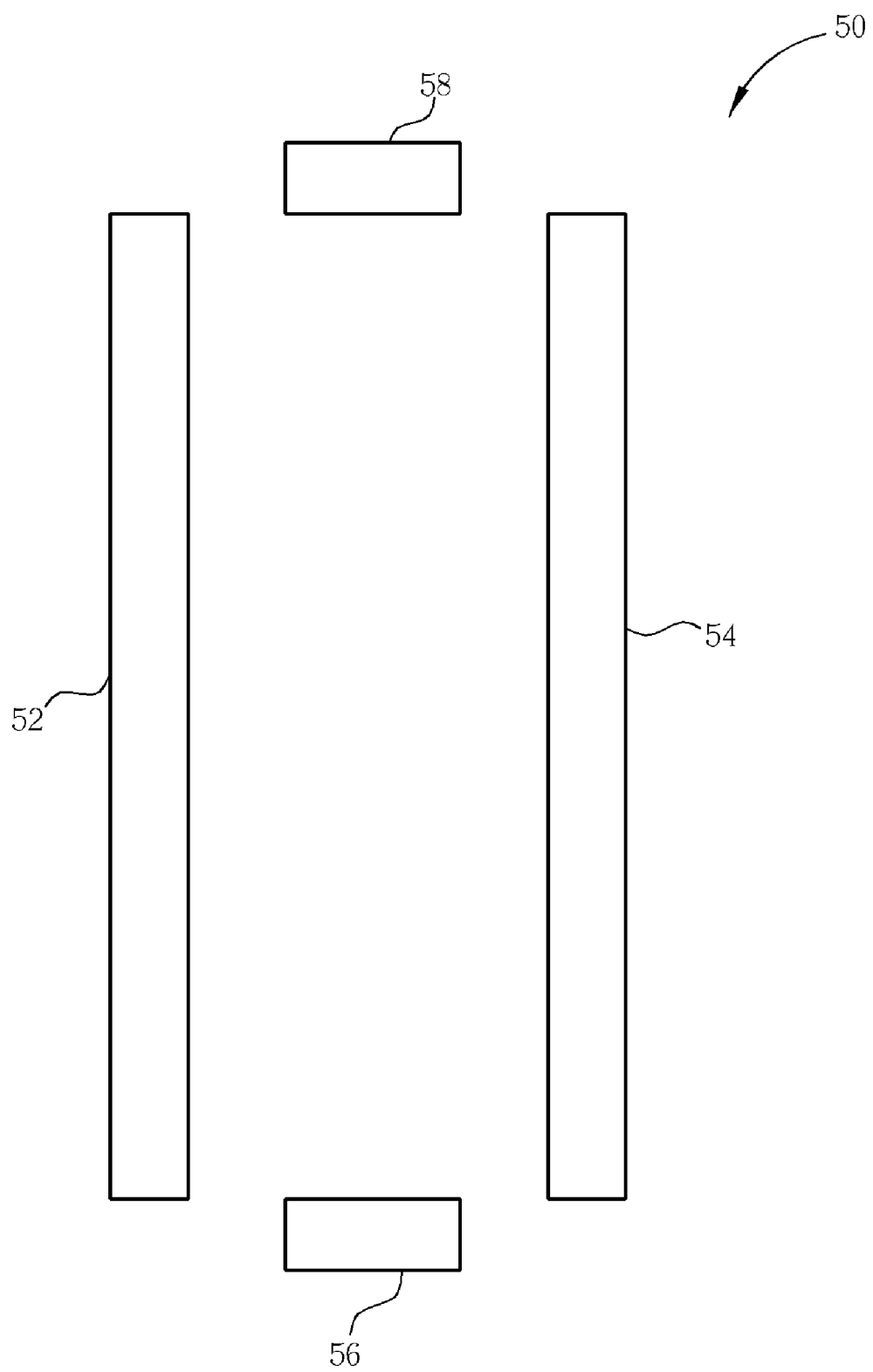
FIGS. 5-9 are schematic diagrams of the method for arranging virtual patterns through instructions executed by a computer readable medium comprising multiple instructions stored in a computer readable device according to a first embodiment of the present invention.

Please refer to FIGS. 5-9, which are schematic diagrams of the method for arranging virtual patterns through instructions executed by a computer readable medium comprising multiple instructions stored in a computer readable device according to a first embodiment of the present invention. First, as shown in FIG. 5, a semiconductor layout 50 is provided, which comprises circuit patterns 52, 54, 56, 58. The circuit patterns 52, 54 are long wires parallel to the vertical direction, and the circuit patterns 56, 58 are conductive elements or wires parallel to the horizontal direction. When the circuit patterns 52, 54, 56, 58 are fabricated on a wafer to form a semiconductor device, they may comprise metal materials.

Figure 6:
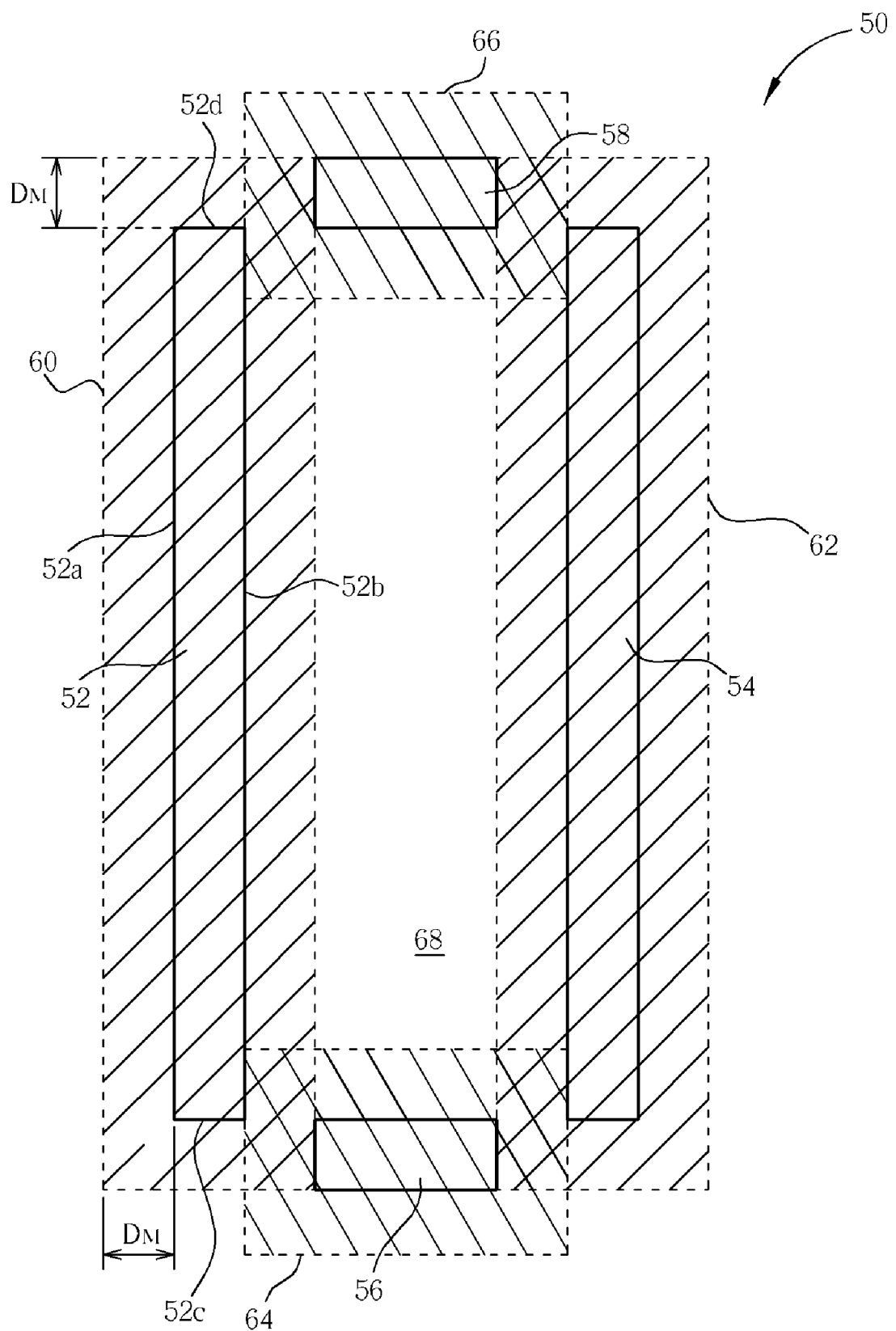

Then, as shown in FIG. 6, a restriction condition for arranging the virtual patterns is provided. The restriction condition comprises considering a minimum interval restriction to set a minimum interval $D_M$ according to the layout design and process conditions of the semiconductor layout 50 and to add the minimum interval $D_M$ outward from the boundaries of each of the circuit patterns 52, 54, 56, 58 so as to set the forbidden areas of the semiconductor layout 50. Taking the circuit pattern 52 as an example, the minimum interval $D_M$ is added outward from the left boundary 52a and the right boundary 52b along the horizontal direction, while the minimum interval $D_M$ is also added outward from the upper boundary 52d and the lower boundary 52c along the vertical direction. Therefore, the forbidden area 60 of the circuit pattern 52 is set, as the area 60 marked with oblique lines in FIG. 6. Similarly, the same method can be used to set the forbidden areas 62, 64, 66 of the circuit patterns 54, 56, 58 respectively by adding the minimum interval $D_M$ from the boundaries of the circuit patterns 54, 56, 58.

According to the present invention method, virtual patterns cannot be disposed in the portions of the semiconductor layout 50 that are set as the forbidden areas 60, 62, 64, 66, but can be disposed in the portions of the semiconductor layout 50 other than the forbidden areas 60, 62, 64, 66, which can be defined as a virtual pattern arrangement area 68. In this embodiment, the virtual pattern arrangement area 68 has a rectangular closed pattern.

Figure 7:
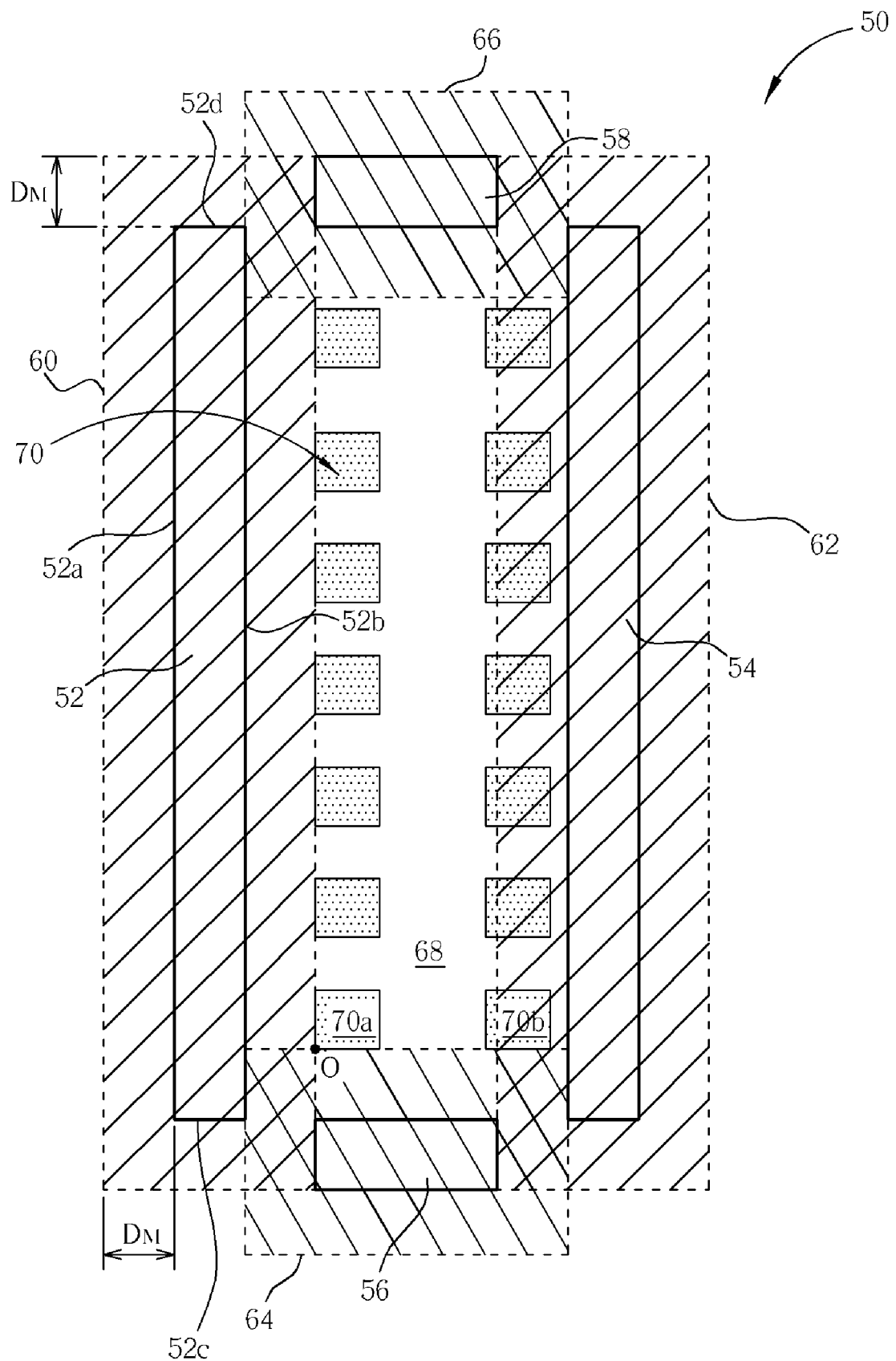
Figure 8:
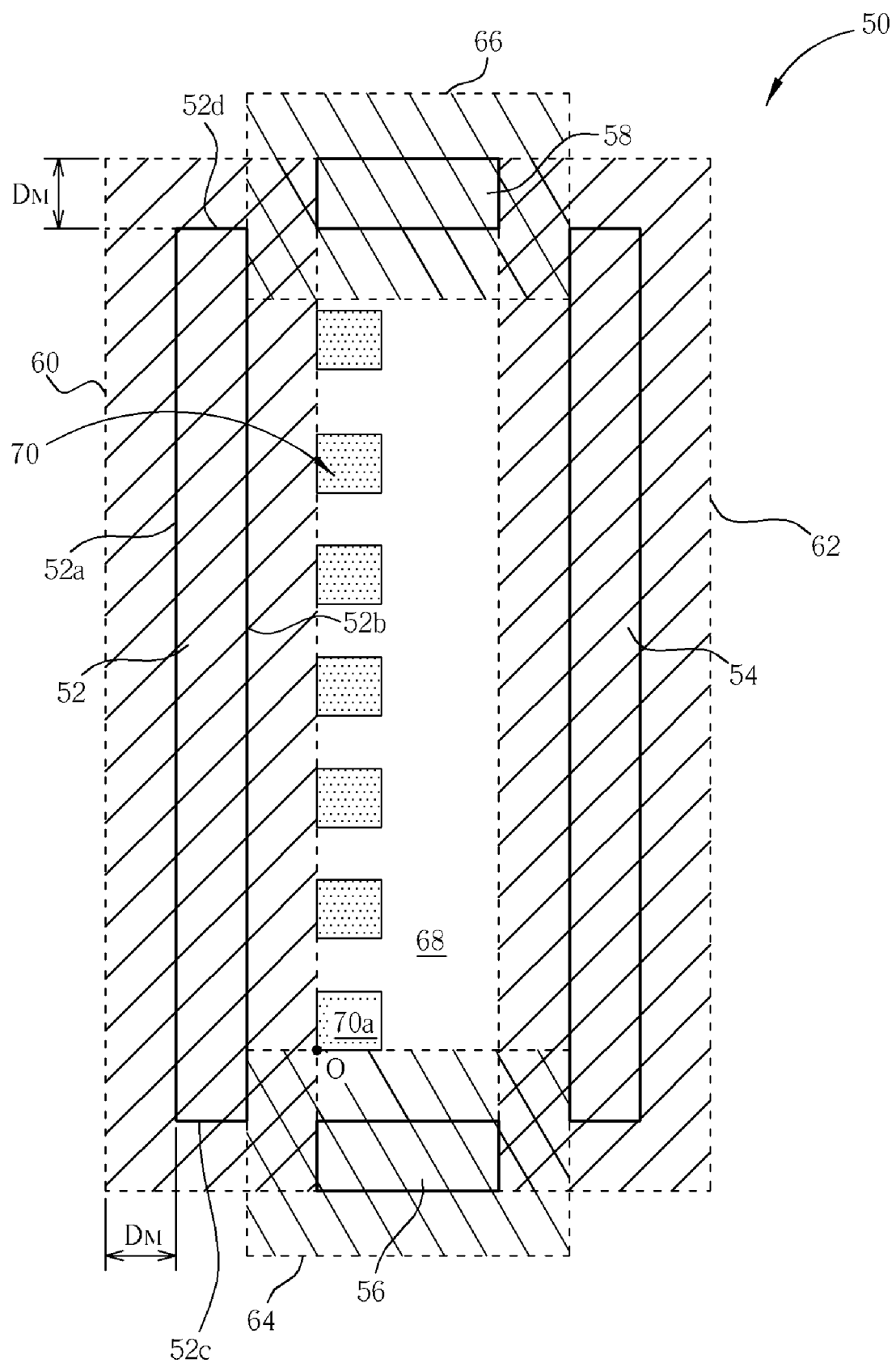

Referring to FIG. 7, a positioning point is selected at a boundary of the virtual pattern arrangement area 68, wherein the positioning point is preferably positioned at a corner or vertex of the boundaries of the virtual pattern arrangement area 68, as the positioning point O show in FIG. 7. Sequentially, the positioning point O is taking as an origin of a coordinate system of virtual patterns to provide a virtual pattern array 70 on the semiconductor layout 50, positioning in the virtual pattern arrangement area 68. The virtual pattern array 70 comprises a plurality of virtual patterns 70a, 70b side by side, having a distance larger than or equal to the minimum interval $D_M$. However, since the virtual patterns 70b in the second column of the virtual pattern array 70 overlap the forbidden area 62, the virtual patterns 70b in the second column of the virtual pattern array 70 have to be deleted, and the virtual patterns 70a in the first column are reserved and considered as effective virtual patterns, as shown in FIG. 8. Therefore, at least one virtual pattern 70a is right disposed at the positioning point O, which means the boundary of at least one virtual pattern 70a overlaps the positioning point O because it is taking as the origin of the coordinate system of the virtual patterns 70a.

Figure 9:
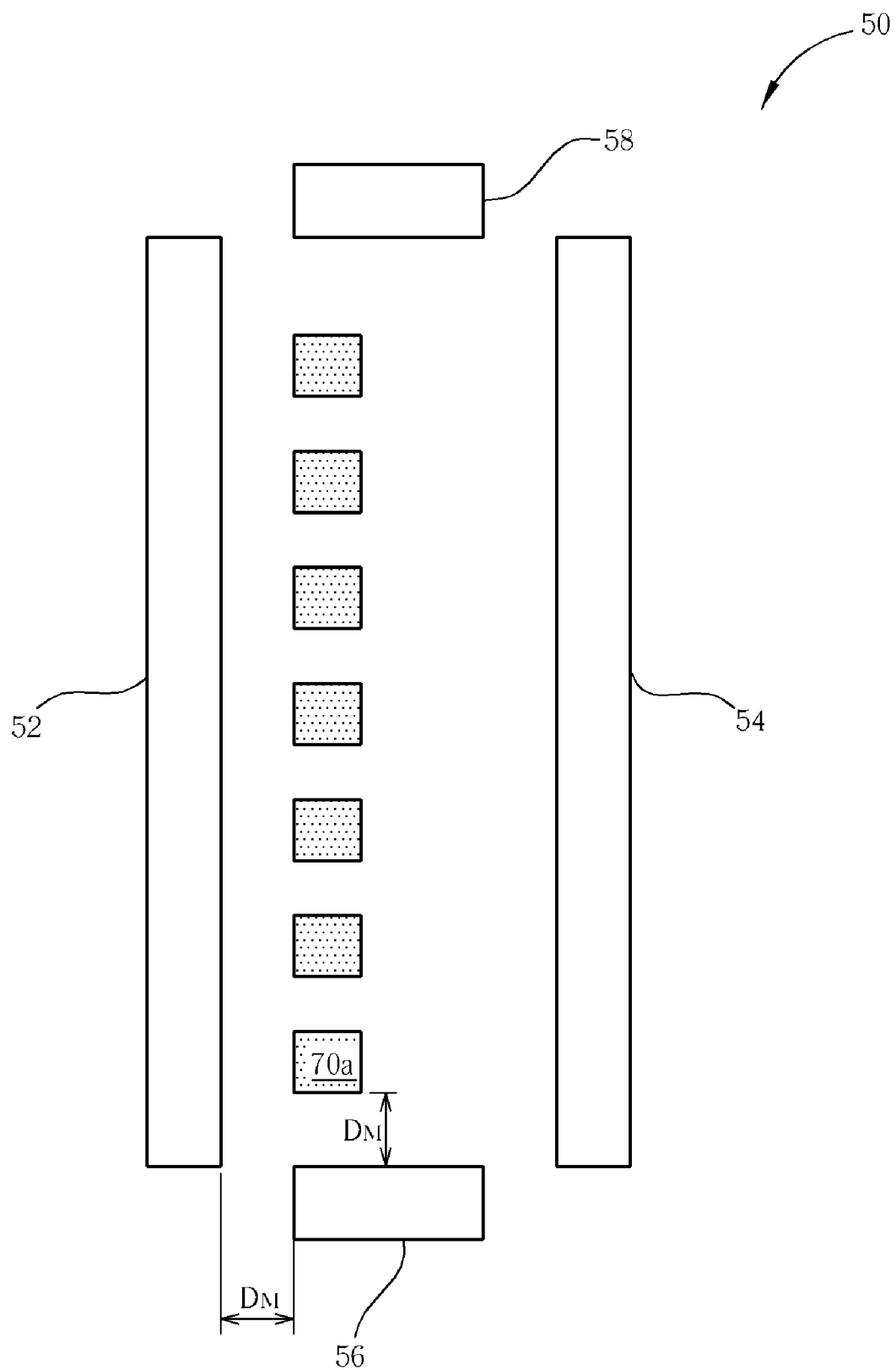
Figure 10:
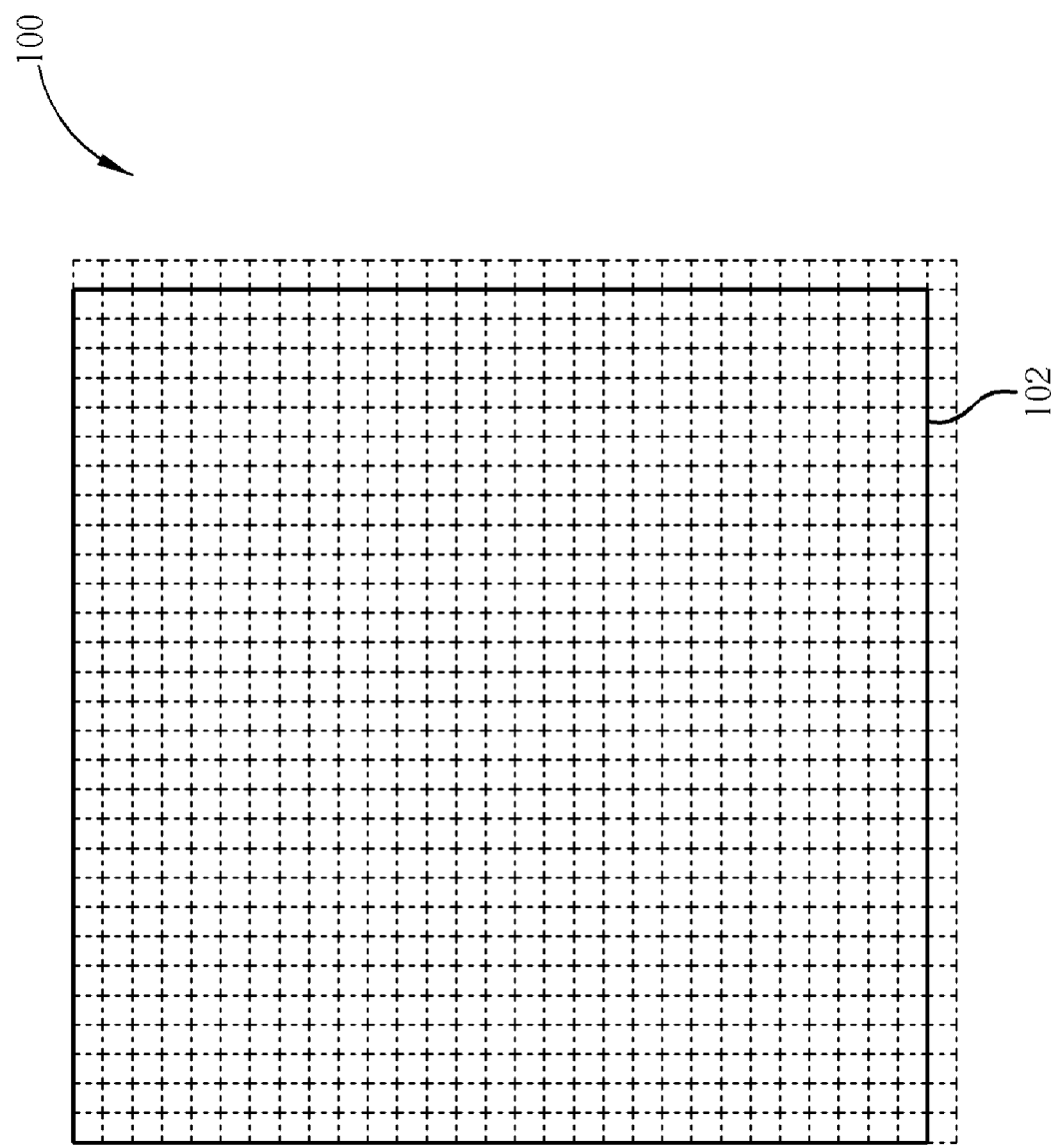
FIGS. 10-17 are schematic diagrams of the method for arranging virtual patterns through instructions executed by a computer readable medium comprising multiple instructions stored in a computer readable device according to a second embodiment of the present invention.

Finally, referring to FIG. 9, the effective virtual patterns 70a and the circuit patterns 52, 54, 56, 58 of the original semiconductor layout 50 are combined to be outputted and fabricated on a photomask, wherein the distances between the virtual patterns 70a and the circuit patterns 52, 54, 56, 58 are larger than or equal to the minimum interval $D_M$. in this embodiment, each virtual pattern 70a is a dummy pattern, which is an extra layout pattern without electric functionality disposed between the circuit patterns 52, 54, 56, 58 in an iso region so as to improve the process uniformity. As a result, when the semiconductor layout 50 is fabricated on a semiconductor device, the virtual patterns 70a may be composed of materials the same as which of the circuit patterns 52, 54, 56, 58, such as metal materials. However, in other embodiments of the present invention, the method of arranging the dummy patterns may be applied to various layouts containing electric elements with different functionalities. For example, the circuit patterns in the iso region of the semiconductor layout may be a pattern of a polysilicon layer or an active area pattern. In this situation, the corresponding dummy patterns may be fabricated with polysilicon or materials the same as the active area.

Figure 11:
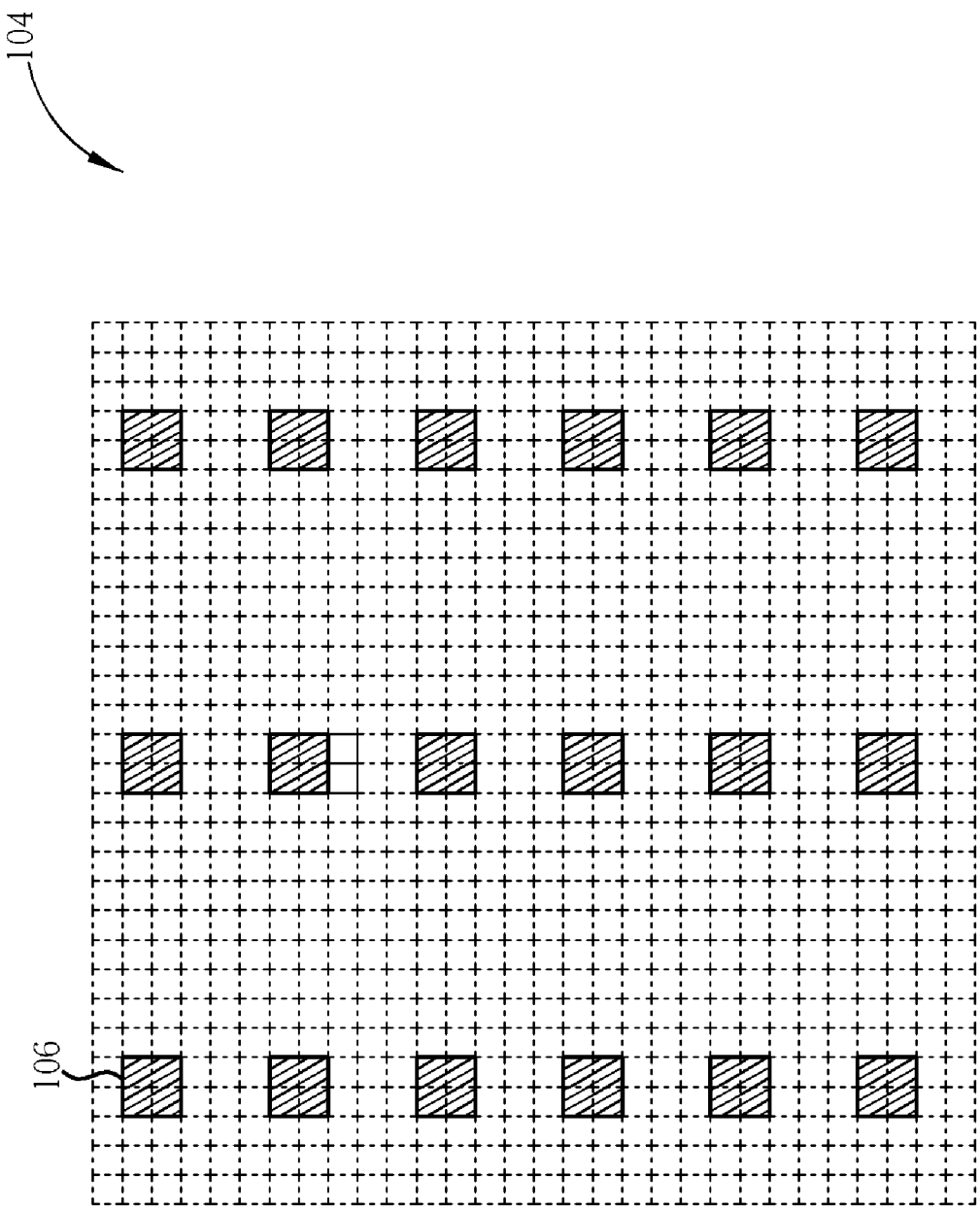
Figure 12:
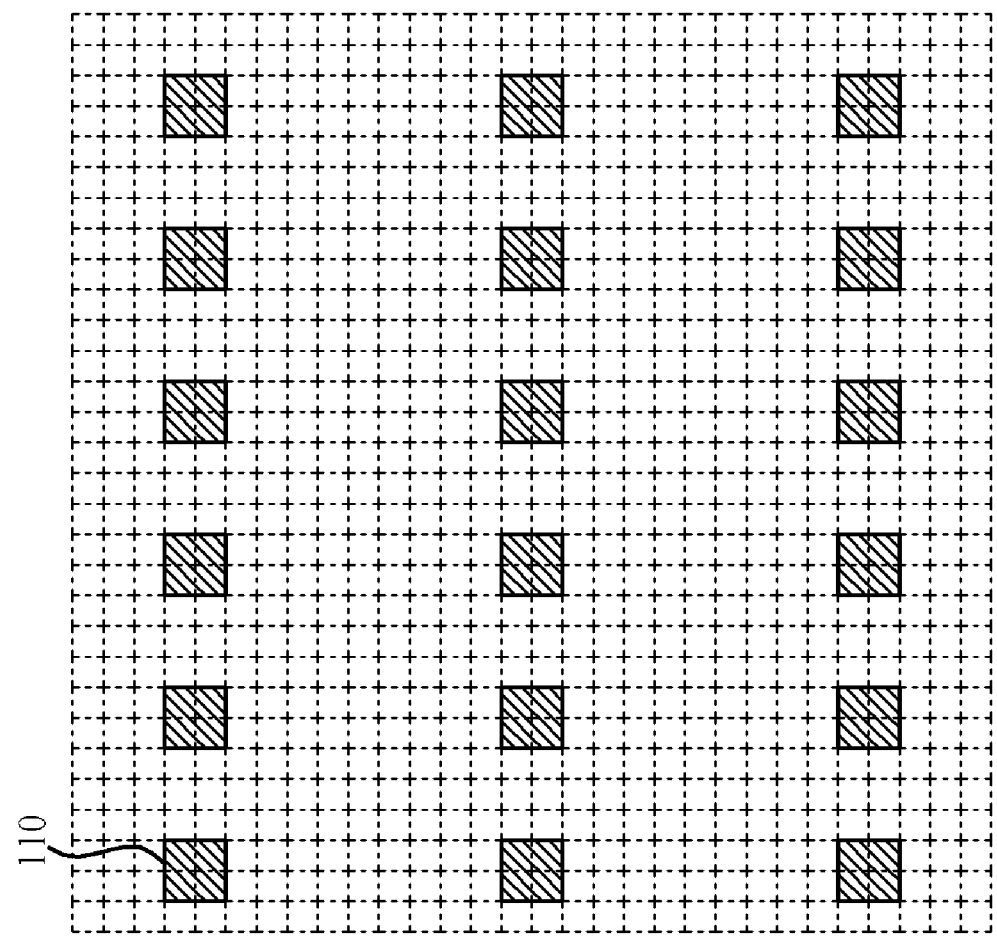
Figure 13:
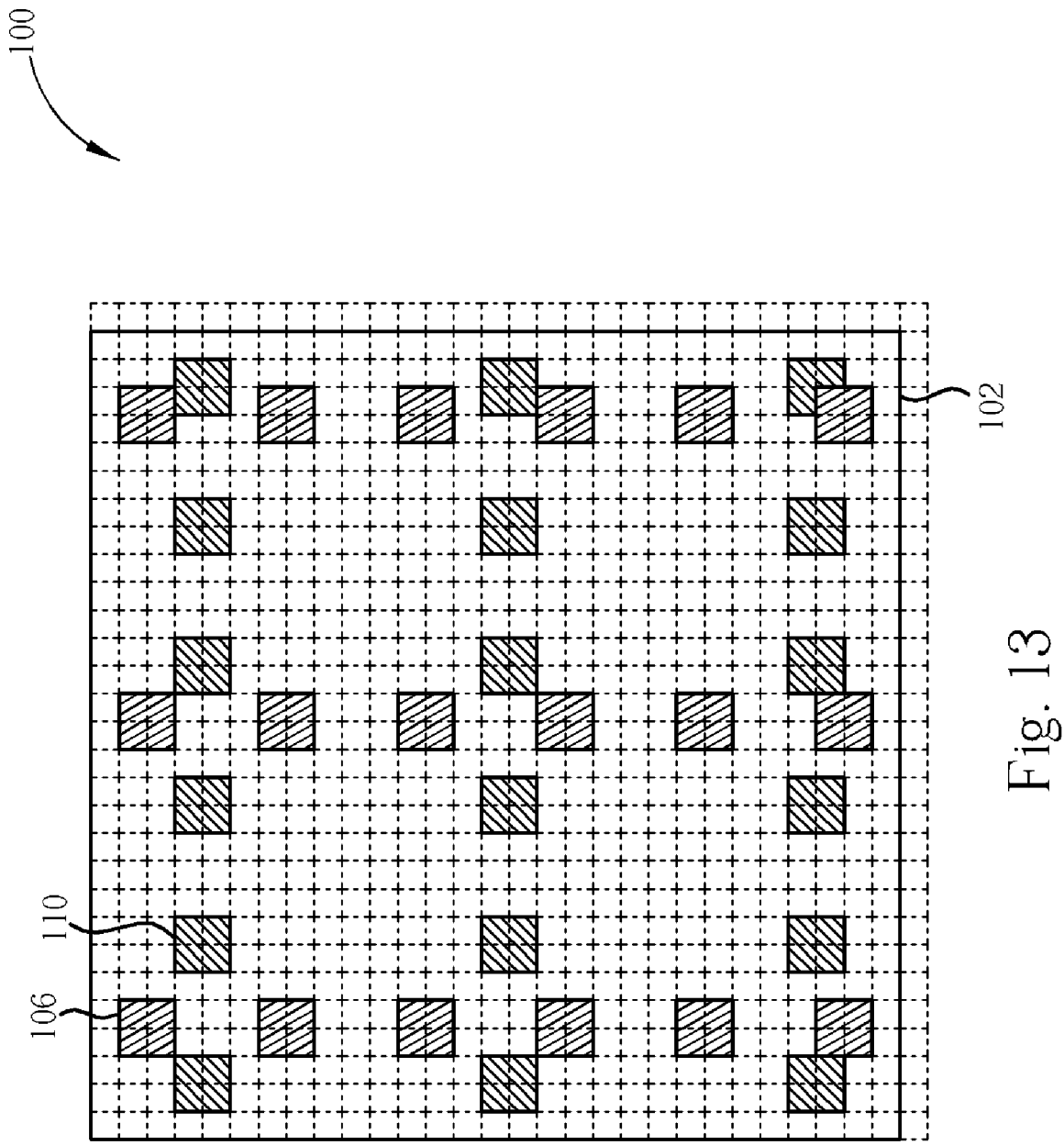

Please refer to FIG. 10 to FIG. 17. FIG. 10 to FIG. 17 are schematic diagrams of the method for arranging virtual patterns through instructions executed by a computer readable medium comprising multiple instructions stored in a computer readable device according to a second embodiment of the present invention. First, a semiconductor layout 100 is provided, which comprises at least a wide wire pattern 102. However, FIG. 10 only shows a portion of the semiconductor layout 100 for explanation. For improving the problem of variation of metal stress and chemical mechanical polishing (CMP) performance, a plurality of virtual patterns, which have slot structures, have to be disposed in the wide wire pattern 102. In order to avoid the disposed virtual patterns affecting the electric operations of the wide wire pattern 102 and other electric elements, the arrangement of electric elements on other semiconductor layouts lower or upper than the semiconductor layout 100 in the same semiconductor device have to be considered. Referring to FIGS. 11 and 12, if the semiconductor layout 100 corresponds to the element arrangement of an nth layer of a semiconductor device, FIGS. 11 and 12 are schematic diagrams of semiconductor layouts 104, 108 that correspond to the element arrangements of an n−1th layer and an n+1th layer of the same semiconductor device respectively. The semiconductor layouts 104, 108 comprise pluralities of contact hole patterns 106, 110 respectively. When fabricating the semiconductor device, the contact elements corresponding to the contact hole patterns 106, 110 are electrically connected to the wide wire corresponding to the wide wire pattern 102. Accordingly, the virtual patterns of the semiconductor layout 100 should not overlap the contact hole patterns 106, 110. In order to set the forbidden area before providing the virtual patterns, the designer could superimpose the semiconductor layouts 104, 108 on the semiconductor layout 100, as shown in FIG. 13.

Figure 14:
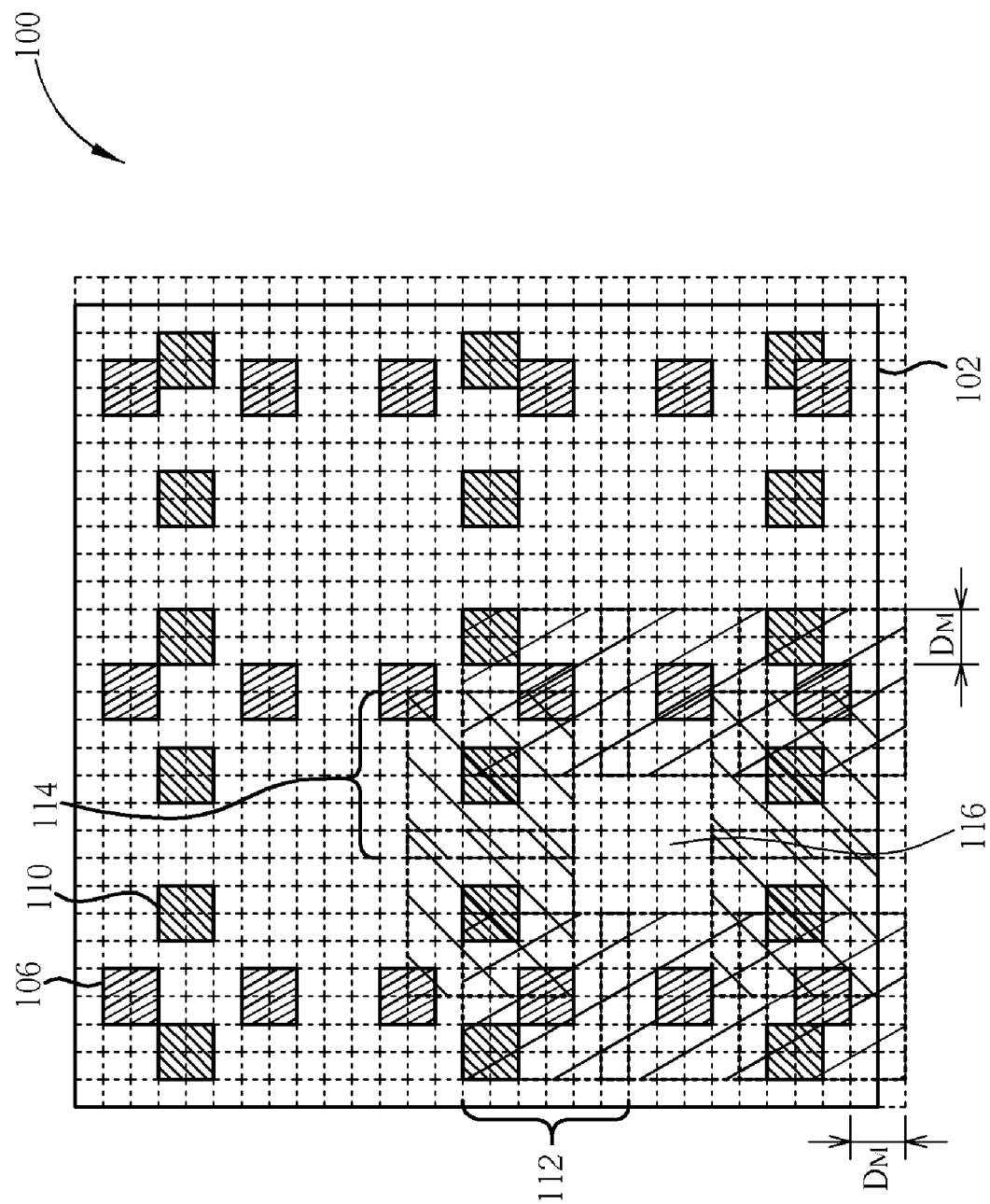
Figure 15:
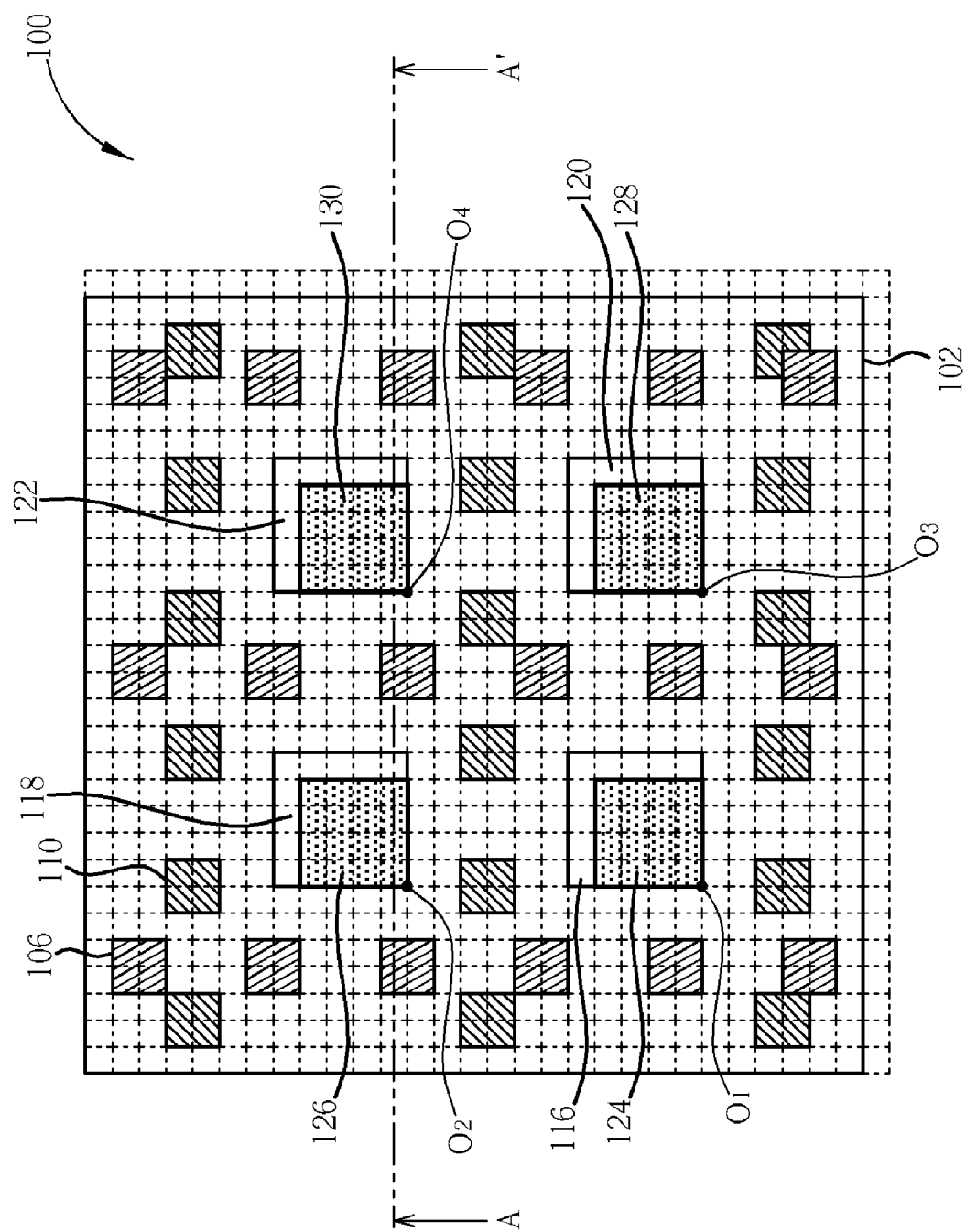
Figure 16:
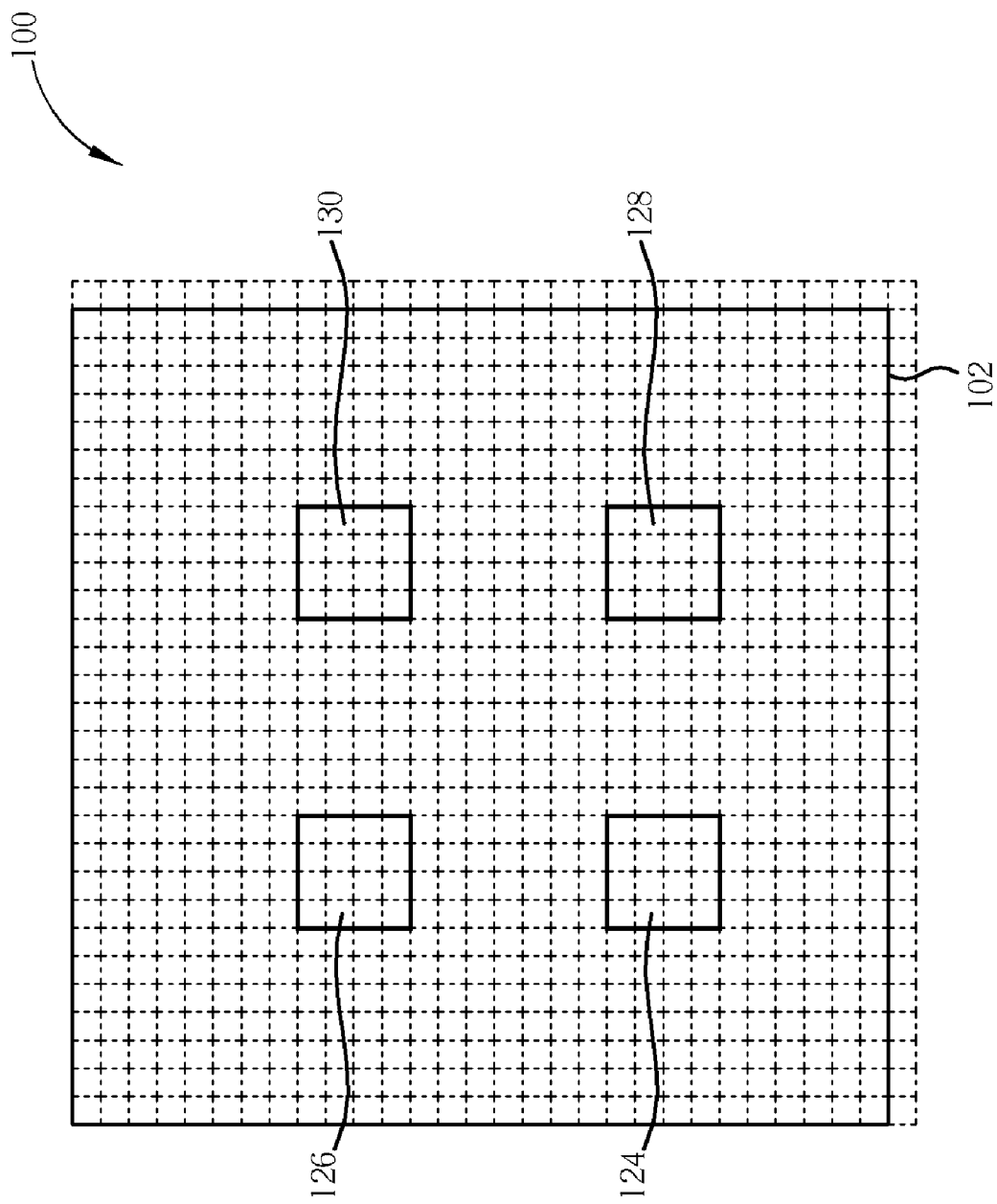

Please refer to FIG. 14. Then, according to the restriction condition of minimum interval, at least a forbidden area should be set on the semiconductor layout 100. First, a distance of minimum interval $D_M$ has to be added from the boundary of each of the contact hole patterns 106, 110 along the horizontal and vertical directions respectively so as to set a corresponding forbidden area on the semiconductor layout 100. Taking the left and bottom part of the semiconductor layout 100 as an example, the portion corresponding to one of the contact hole patterns 106 is set as a forbidden area 112, and the portion corresponding to the one of the contact hole patterns 110 is set as a forbidden area 114, such that the portion of the semiconductor layout 100 not corresponding to the forbidden areas 112, 114 is defined as the virtual pattern arrangement area 116 surrounded by the forbidden areas 112, 114. Referring to FIG. 15, three other virtual pattern arrangement areas 118, 120, 122 with closed patterns could be defined through the similar methods. The virtual pattern arrangement areas 116, 118, 120, 122 are separate and not overlapped with each other. Then, a positioning point is selected at the boundary of each of the virtual pattern arrangement areas 116, 118, 120, 122 for serving as an origin $O_1$, $O_2$, $O_3$, $O_4$ of the coordinate system of virtual patterns so that a virtual pattern array is provided inside each of the virtual pattern arrangement areas 116, 118, 120, 122. During providing virtual pattern arrays, the virtual patterns that overlaps the forbidden areas (such as the forbidden area 114 shown in FIG. 14) have to be removed, and the remaining virtual patterns 124, 126, 128, 130 can be considered as effective virtual patterns that compose the complete semiconductor layout together with the wide wire pattern 102, which would be outputted for forming a photomask, as shown in FIG. 16.

Figure 17:
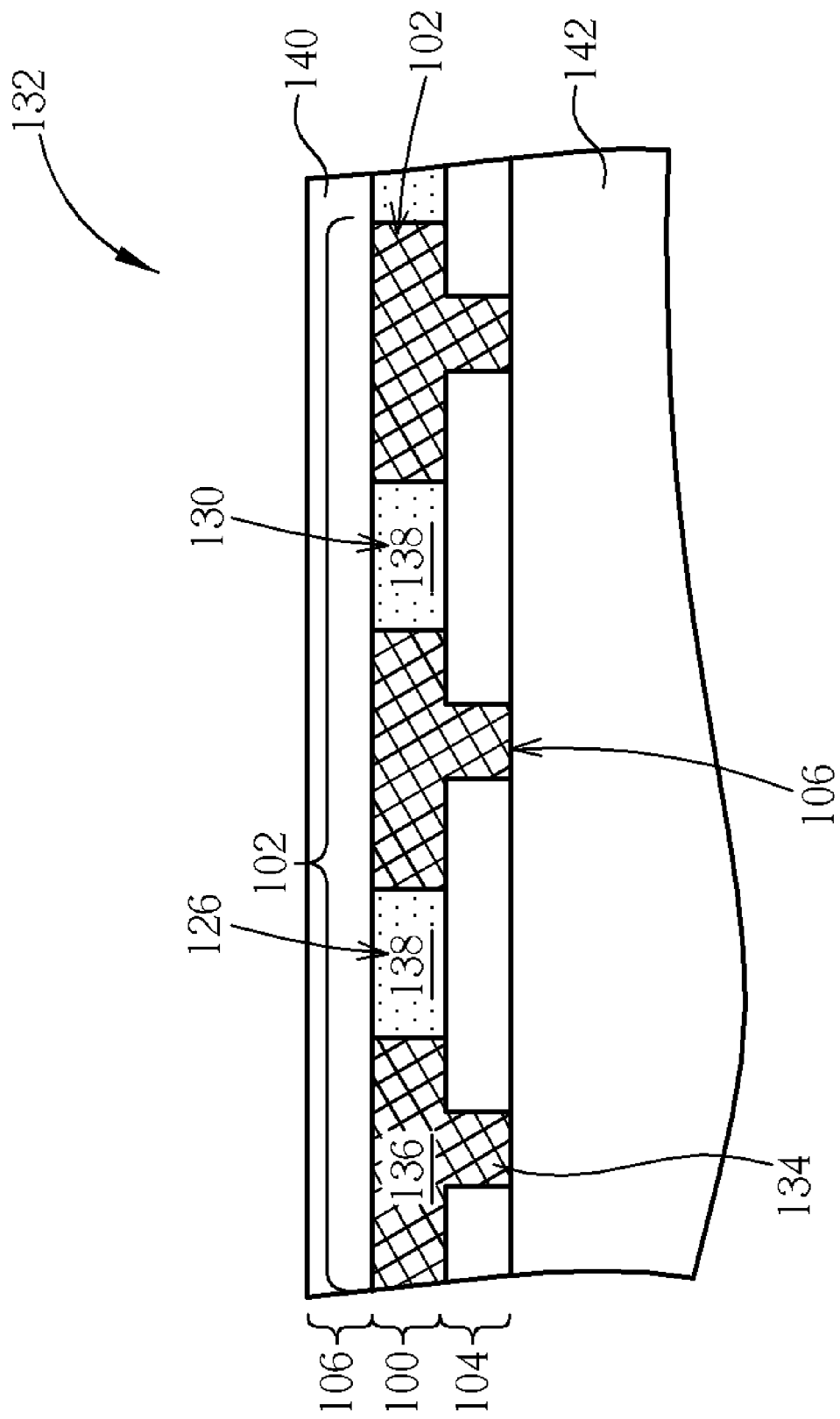

In this embodiment, in order to improve the performances of CMP and to solve the problem of variation of metal stress, the virtual patterns 124, 126, 128, 130 are disposed inside the wide wire pattern 102, and therefore they are named slot patterns. When the semiconductor layout 100 is fabricated on a semiconductor device, the wide wire pattern 102 is composed of metal materials, and the portions that correspond to the virtual patterns 124, 126, 128, 130 form slot structures, which may comprise dielectric layers. FIG. 17 is a schematic sectional diagram of a semiconductor device 132 that corresponds to the section view along line AA' of the semiconductor layout 100 shown in FIG. 15. As shown in FIG. 17, when the semiconductor layouts 100, 104, 106 are fabricated on the semiconductor device 132, the semiconductor layout 100 corresponds to the elements arrangement of the $n^{th}$ layer of the semiconductor device 132, and the semiconductor layouts 104, 106 corresponds to the element arrangements of the $n-1^{th}$ layer and the $n+1^{th}$ layer on a substrate 142 of the semiconductor device 132 respectively. Therefore, the semiconductor layouts 104, 106 are the neighbor lower layer and the upper layer of the semiconductor layout 100 when they are fabricating on the semiconductor device 132. The contact hole patterns 106 correspond to the contact elements 134 of the semiconductor device 132, and the wide wire pattern 102 corresponds to the wide wire 136 that is electrically connected to the contact elements 134, wherein all of the contact elements 134 and the wide wire 136 may be formed by metal materials. In addition, the virtual patterns 126, 130 correspond to the slots 138 that may comprise dielectric materials, such as oxide layer or other materials the same as that of the dielectric layer 140.

In other embodiments of the present invention, when one virtual pattern arrangement area has an irregular shape or an open pattern, the virtual pattern arrangement area may be divided into several sub virtual pattern arrangement areas with rectangular or simple geometry patterns. For example, the virtual pattern arrangement area may be divided by use of an extending line of the boundary of the forbidden area or the virtual pattern arrangement area. Then, a positioning point of each sub virtual pattern arrangement area can be selected for providing a virtual pattern array in each sub virtual pattern arrangement area.

Figure 18:
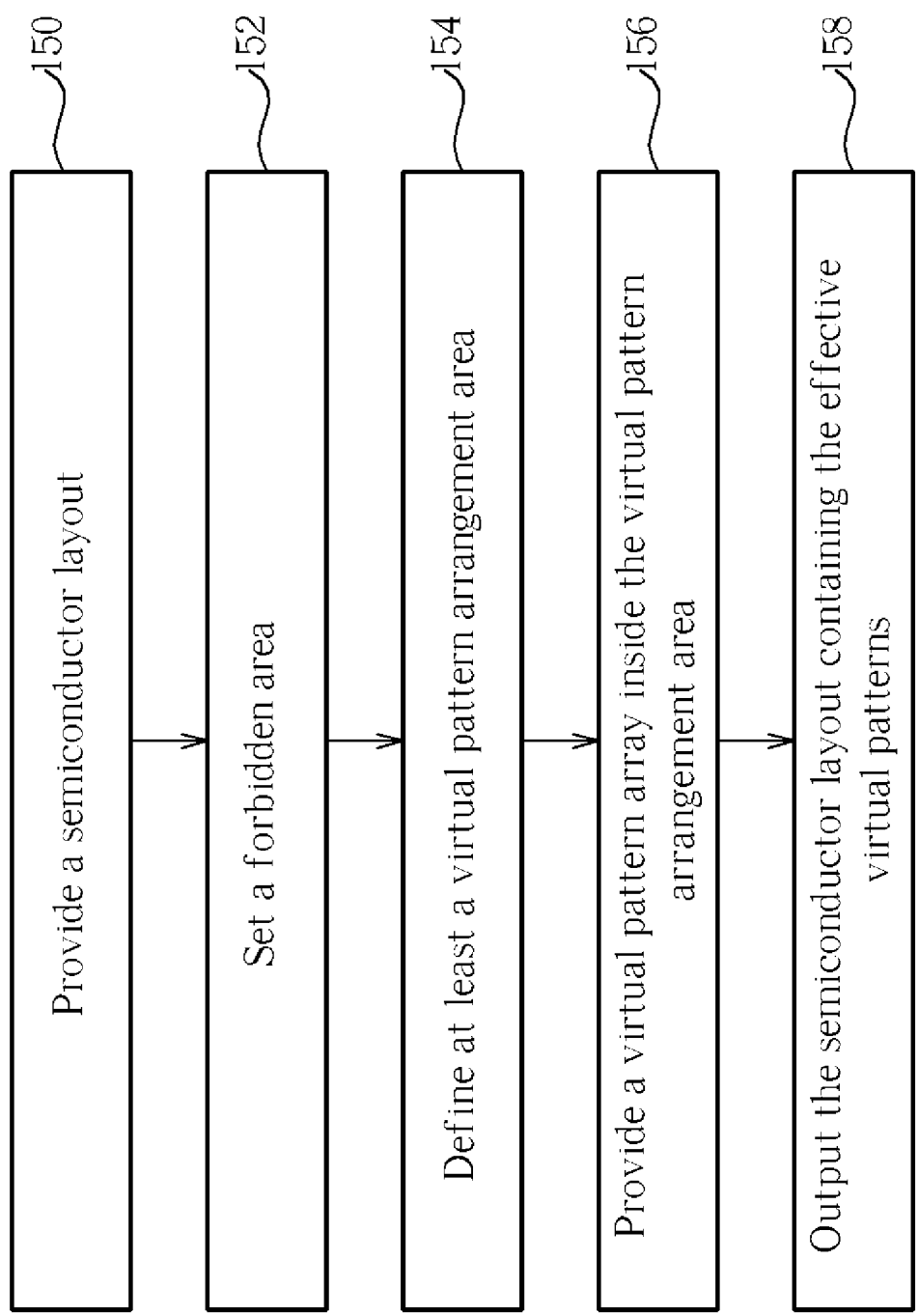
FIG. 18 is a process diagram of the method for arranging virtual patterns through instructions executed by a computer readable medium comprising multiple instructions stored in a computer readable device according to the present invention.

FIG. 18 is a process diagram of the method for arranging virtual patterns through instructions executed by a computer readable medium comprising multiple instructions stored in a computer readable device of the present invention. The method comprises the following steps:

Step 150: Provide a semiconductor layout and a circuit pattern, wherein the circuit pattern may be contained by the semiconductor layout when it comprises wire, polysilicon, or active area patterns, or be contained by another semiconductor layout when it comprises a contact hole pattern.

Step 152: Set a forbidden area of the circuit pattern according to a restriction condition, such as a minimum interval restriction.

Step 154: Define at least a virtual pattern arrangement area on the portion of the semiconductor layout not corresponding to the forbidden area.

Step 156: Select a positioning point at a boundary of the virtual pattern arrangement area for serving as an origin of a coordinate system of virtual patterns to provide a virtual pattern array inside the virtual pattern arrangement area, comprising deleting the virtual patterns of the virtual pattern array that overlap the forbidden area and considering the remaining virtual patterns not overlapping the forbidden area as effective virtual patterns.

Step 158: Output the semiconductor layout containing the effective virtual patterns.

In contrast to the prior art, the present invention method comprises setting the forbidden area on the semiconductor layout before providing the virtual pattern array, defining the virtual pattern arrangement area according to the position of the forbidden area, and providing the virtual patterns by starting from a boundary of the virtual pattern arrangement area. As a result, more virtual patterns could be arranged in the virtual pattern arrangement area for solving the problems caused by iso-dense loading defects in the prior art and improving the process performance of the semiconductor device.

Those skilled in the art will readily observe that numerous modifications and alterations of the device and method may be made while retaining the teachings of the invention.

What is claimed is:

1. A computer readable medium comprising multiple instructions stored in a computer readable device, upon executing these instructions, a computer performing the following steps:
   (a) providing a semiconductor layout, the semiconductor layout comprising a circuit pattern;
   (b) setting a forbidden area of the circuit pattern on the semiconductor layout according to a restriction condition, wherein the restriction condition comprises a minimum interval restriction, and the minimum interval restriction comprises adding the minimum interval outward from a boundary of the circuit pattern;
   (c) defining at least a virtual pattern arrangement area on a portion of the semiconductor layout which does not correspond to the forbidden area, wherein the virtual pattern arrangement area is a closed pattern enclosed by the forbidden area; and
   (d) providing a virtual pattern array inside the virtual pattern arrangement area.

2. The computer readable medium of claim 1, wherein the step (d) comprises selecting a positioning point at a boundary of the virtual pattern arrangement area and providing the virtual pattern array by taking the positioning point as an origin of a coordinate system of the virtual pattern array.

3. The computer readable medium of claim 1, wherein the step (c) comprises defining a plurality of virtual pattern arrangement areas.

4. The computer readable medium of claim 3, wherein the step (d) comprises selecting a positioning point of each of the virtual pattern arrangement areas and providing a virtual pattern array according to the positioning point inside the corresponding virtual pattern arrangement areas.

5. The computer readable medium of claim 1, wherein the step (d) comprises deleting virtual patterns of the virtual pattern array that overlap the forbidden area.

6. The computer readable medium of claim 1, wherein the minimum interval restriction comprises adding the minimum interval along a horizontal direction and a vertical direction of the circuit pattern respectively.

7. The computer readable medium of claim 1, wherein the virtual pattern array comprises at least a dummy pattern.

8. The computer readable medium of claim 1, wherein the circuit pattern comprises at least a wire pattern, a polysilicon layer pattern, or an active area pattern.

9. The computer readable medium of claim 1, wherein the formation material of the circuit pattern comprises metal when the semiconductor layout is fabricated on a semiconductor device.

* * * * *